Nov. 8, 1966  R. W. MOHLER  3,283,730
ICE CREAM MOLD

Filed Oct. 2, 1964  2 Sheets-Sheet 1

Roland W. Mohler
INVENTOR.

BY *Clarence A. O'Brien*
*and Harvey B. Jacobson*
Attorneys

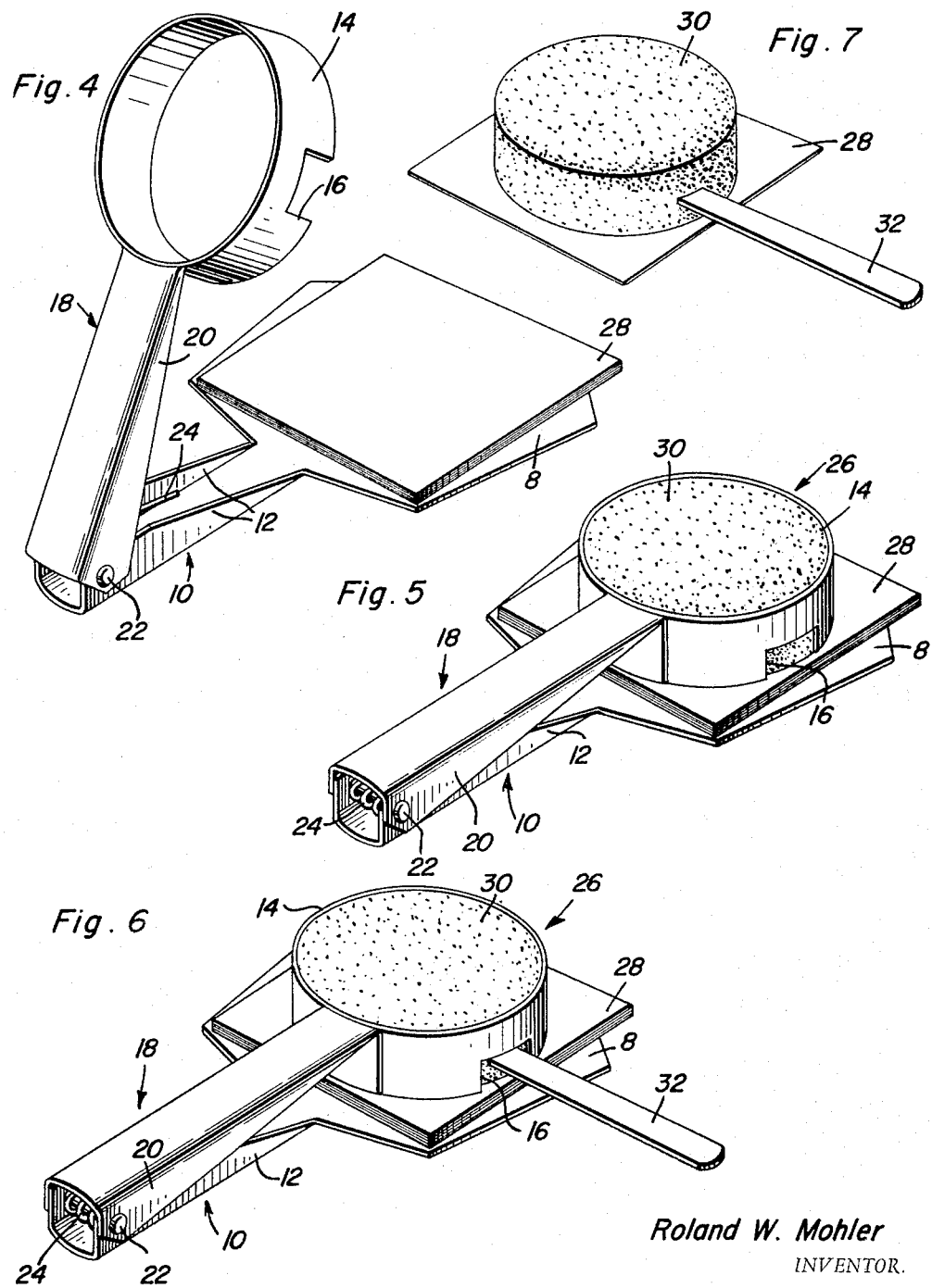

United States Patent Office 3,283,730
Patented Nov. 8, 1966

3,283,730
ICE CREAM MOLD
Roland W. Mohler, R.R. 3, Litchfield, Minn.
Filed Oct. 2, 1964, Ser. No. 401,038
2 Claims. (Cl. 107—19)

This invention generally relates to new and useful improvements in molds particularly although not necessarily, for ice cream, ice milk, etc. and has for its primary object to provide, in a manner as hereafter set forth, novel means for expeditiously forming such confections on a stick preparatory to quick-freezing the product.

Another highly important object of the present invention is to provide an improved frozen confection mold of the aforementioned character which permits the product to be formed on the uppermost of a previously positioned stack of wax paper sheets or other suitable material for facilitating the handling of the product and expediting the operation.

Other objects of the invention are to provide a frozen confection mold of the character set forth which is comparatively simple in construction, strong, durable, compact, of light weight, sanitary and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 4, 5 and 6 are perspective views illustrating the several steps taken in forming the product; and FIGURE 7 is a perspective view of the product.

Figure 1:
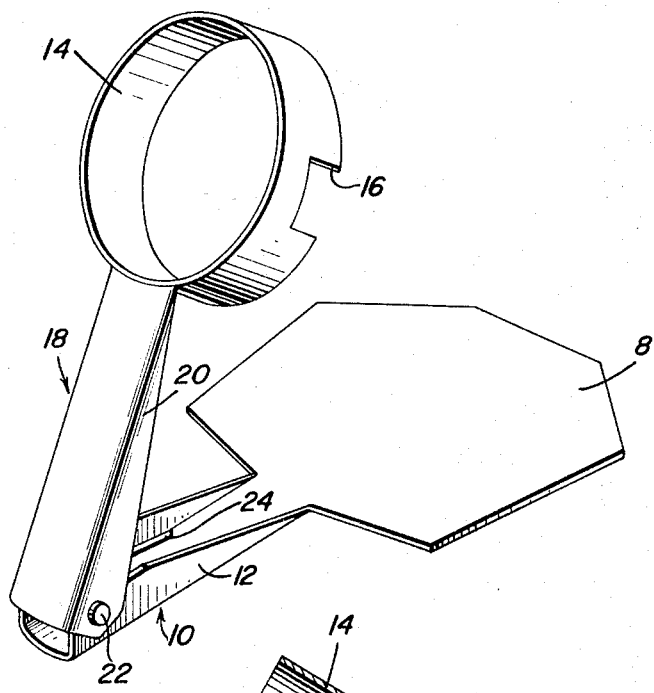
FIGURE 1 is a perspective view of a frozen confection mold constructed in accordance with the present invention.
Figure 2:
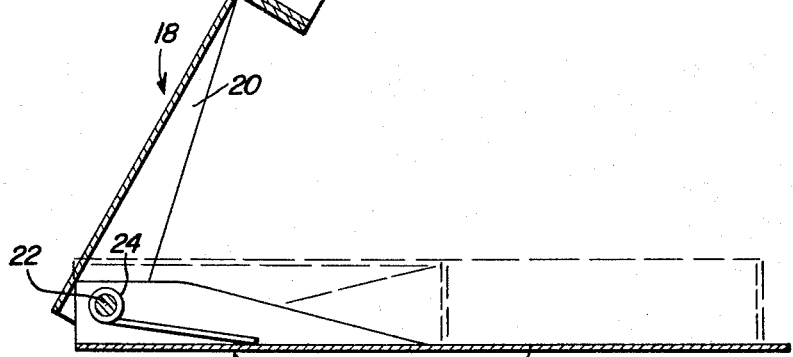
FIGURE 2 is a view in vertical longitudinal section through the device.
Figure 3:
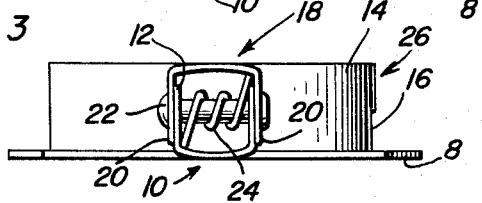
FIGURE 3 is a rear end elevational view.

Referring now to the drawing in detail, it will be seen that the embodiment of the invention which has been illustrated comprises a flat metallic plate 8 of suitable shape and dimensions. In the embodiment shown, the plate 8 is polygonal. Formed integrally with the plate 8 on an edge portion thereof and extending rearwardly therefrom in the plane of said plate is a handle 10. The handle 10 is generally channel-shaped, said handle including upstanding flanges 12.

Cooperable with the plate 8 is a cylindrical metallic ring 14. The ring 14 has formed in one end portion a notch or recess 16 the purpose of which will be presently set forth.

Fixedly mounted on the ring 14 and extending radially therefrom in the plane of the other end thereof is a handle 18. The handle 18 is substantially inverted channel-shaped, said handle including side flanges 20 which receive the flanges 12 of the handle 10 therebetween. A pin 22 pivotally connects the handles 10 and 18, said pin passing through aligned openings provided therefor in the flanges 12 and 20 adjacent the outer ends of said handles. A coil spring 24 on the pin 22 has its end portions engaged under tension with the handles 10 and 18 for yieldingly urging said handles away from each other.

It is thought that the use of the mold will be readily apparent from a consideration of the foregoing. Briefly, the ring 14, in conjunction with the plate 8, provides a circular mold or form which is designated generally by reference numeral 26. In addition to forming the bottom of the mold 26, the plate 8 functions as a base for the device on a suitable supporting surface. As shown in FIGURE 1 of the drawing, the mold 26 is normally held open by the spring 24. Preparatory to the molding operation, a stack of waxed paper sheets, for example, is positioned on the plate 8 as indicated at 28. Against the action of the spring 24, the ring 14 is then engaged on the stack 28 and said ring is then filled with the mixture, as indicated at 30. The stick 32 is then inserted in the mixture 30 through the notch or recess 16 in the ring 14. Or, if desired, the stick 32 may be inserted and held in position before the ring is filled. The spring 24 is then permitted to open the mold 26, the ring 14 swinging upwardly and leaving the mixture 30 with the stick 32 therein on the stack 28. The top sheet of the stack 28 with the product thereon may then be removed and transferred to a quick freezer prior to coating the mixture with chocolate. The device is then ready for the next operation, a new sheet of waxed paper already being in position. The construction of the device is such that it may be easily cleaned and maintained in a sanitary condition at all times. As will be apparent, the device is readily controlled with the hand which grips the handles 10 and 18. As will also be apparent, when the mold 26 is closed the stack 28 is clamped between the plate 8 and the ring 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A frozen confection form comprising a pair of opposed elongated handles, said handles being generally channel-shaped and including lapped side flanges having registering openings in one end portion, a pin in the openings pivotally connecting the handles, a spring on the pin having its end portions engaged with the handles for yieldingly urging same apart, a flat base plate on the free end of one of the handles in the plane of the bight portion thereof, a cylindrical ring on the free end of the other handle cooperable with the plate and, in conjunction therewith, providing a mold for the reception of a mix, and a stack of sheets in the mold and removable one at a time with the mix thereon when the mold is open, said sheets being mounted on the plate and held thereon by the ring when said mold is closed.

2. A frozen confection form in accordance with claim 1, said ring having a recess in one end portion for the insertion of a stick in the mold.

References Cited by the Examiner
UNITED STATES PATENTS

| | | | |
|---|---|---|---|
| 713,897 | 11/1902 | Maxwell | 107—48 |
| 1,639,122 | 8/1927 | Whitman | 107—19.3 |
| 1,888,739 | 11/1932 | Sanders | 107—48 |
| 2,013,879 | 9/1935 | Dillenback | 249—66 |
| 2,860,583 | 11/1958 | Hitch | 249—160 X |

WILLIAM I. PRICE, *Primary Examiner.*